(12) United States Patent
Borzabadi et al.

(10) Patent No.: US 8,375,778 B2
(45) Date of Patent: Feb. 19, 2013

(54) SEALED ENGINE CONTROL MODULE WITH INTEGRAL AMBIENT AIR PRESSURE SENSOR

(75) Inventors: Hamid R. Borzabadi, Noblesville, IN (US); Ronald D. Wilcox, Burton, MI (US); Philip D. Kuznia, Carmel, IN (US); Timothy A. Vas, Kokomo, IN (US); Lewis H. Little, Peru, IN (US); David G. Miller, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 451 days.

(21) Appl. No.: 12/709,644

(22) Filed: Feb. 22, 2010

(65) Prior Publication Data

US 2011/0203359 A1 Aug. 25, 2011

(51) Int. Cl.
*G01M 15/04* (2006.01)
(52) U.S. Cl. ................. 73/114.37; 73/114.61
(58) Field of Classification Search ........... 73/114.37, 73/114.61
See application file for complete search history.

(56) References Cited

U.S. PATENT DOCUMENTS

| | | | | |
|---|---|---|---|---|
| 5,648,615 A * | 7/1997 | Jeske et al. | ...... | 73/756 |
| 6,640,645 B2 * | 11/2003 | Groger | ...... | 73/753 |
| 6,722,205 B2 * | 4/2004 | Bodin | ...... | 73/756 |
| 2001/0049965 A1 * | 12/2001 | Groger | ...... | 73/753 |
| 2002/0005072 A1 * | 1/2002 | Nidan et al. | ...... | 73/715 |
| 2004/0177697 A1 * | 9/2004 | Tokuhara | ...... | 73/715 |

* cited by examiner

*Primary Examiner* — Freddie Kirkland, III
(74) *Attorney, Agent, or Firm* — Lawrence D. Hazelton

(57) ABSTRACT

An engine control module having an environmentally-sealed housing includes a housing-mounted air pressure sensor for providing a reliable measure of atmospheric air pressure to a control circuit mounted within the housing. The sensor is mounted on an inboard face of the housing, and includes a sensor element, a body portion and a riser portion. The sensor element is mounted in the body portion, and the riser portion protrudes through an opening in the housing to couple the sensor element to atmospheric pressure outside the housing. The body portion is sealingly secured to the inboard face of the housing, and a set of conductor pins molded into the body portion extend inward to engage a circuit board enclosed by the housing, and thereby directly couple the sensor element to the ECM's control circuit. The top of the riser portion is capped by a splash-proof lid to prevent water intrusion.

14 Claims, 4 Drawing Sheets

SEALED ENGINE CONTROL MODULE WITH INTEGRAL AMBIENT AIR PRESSURE SENSOR

TECHNICAL FIELD

The present invention relates to engine control modules for vehicles, and more particularly to a sealed engine control module with an integral ambient air pressure sensor.

BACKGROUND OF THE INVENTION

A modern motor vehicle powered by an internal combustion engine is equipped with an engine control module (ECM) for controlling various engine operational parameters such as spark timing, fuel injection, valve timing, emission controls, and so on. The algorithms for carrying out these control functions are based in part on current atmospheric conditions such as ambient air pressure and temperature, and measures of these and other parameters are ordinarily obtained from discrete sensors. In certain instances, the sensors can be mounted on a circuit board within the ECM to minimize system cost, but parameters such as ambient air pressure cannot be reliably sensed inside the ECM, particularly in applications where the housing of the ECM is environmentally-sealed. Accordingly, the ambient air pressure is ordinarily measured with a wired external sensor coupled to the ECM via its wiring harness. For reduced system cost, however, it would be desirable to obtain a reliable measure of ambient air pressure while avoiding the increased expense associated with a wired external sensor.

SUMMARY OF THE INVENTION

The present invention is directed to an improved ECM including an environmentally-sealed housing and an integral air pressure sensor mounted directly on the housing for providing a reliable measure of atmospheric air pressure to a control circuit mounted within the housing. The sensor is mounted on an inboard face of the housing, and includes a sensor element, a body portion and a riser portion. The sensor element is mounted in the body portion, and the riser portion protrudes through an opening in the housing to couple the sensor element to atmospheric air pressure outside the housing. The body portion is sealingly secured to the inboard face of the housing, and a set of conductor pins molded into the body portion extend inward to engage a circuit board enclosed by the housing, and thereby directly couple the sensor element to the ECM's control circuit. The top of the riser portion is capped by a splash-proof lid that prevents water intrusion in applications where the ECM is mounted in an environmentally-exposed location.

DESCRIPTION OF THE PREFERRED EMBODIMENT

Figure 1:
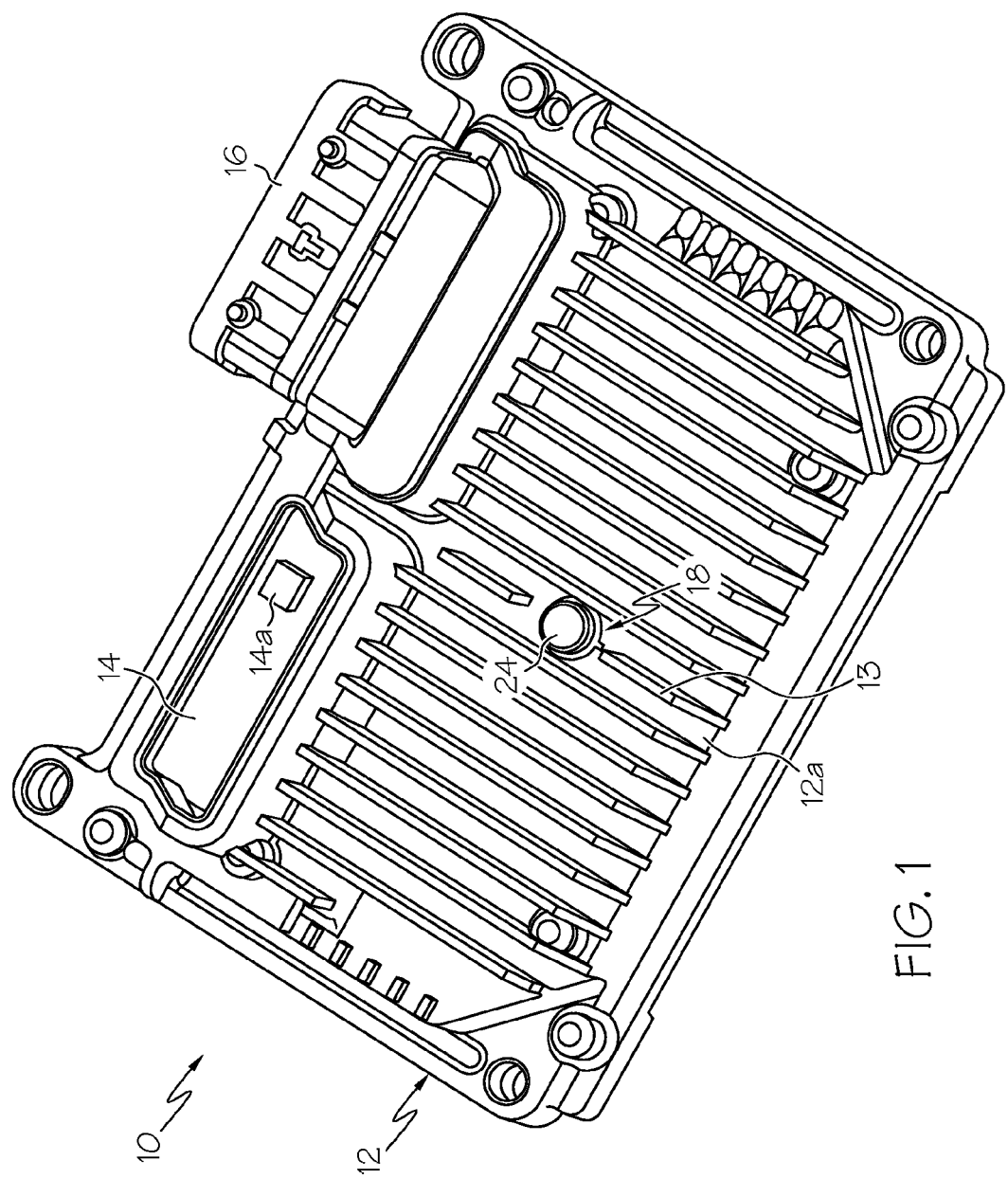
FIG. 1 is an isometric view of an ECM with an integral ambient air pressure sensor according to this invention.

Referring to the drawings, and particularly to FIG. 1, the reference numeral 10 generally designates an ECM according to this invention. In general, the ECM 10 comprises a housing 12 supporting a printed circuit board 14 on which are mounted an number of integrated circuit and discrete electronic devices 14a, including a microprocessor-based controller for executing engine/powertrain control and diagnostic algorithms. Input signals, including sensor signals, and output signals are routed to the circuit board 14 through a pair of molded plastic connectors 16 (only one of which is shown in FIG. 1) affixed to the housing 12. And according to the present invention, the ECM 10 additionally includes an integral ambient pressure sensor 18 that senses the pressure of ambient air external to the housing 12 and electrically interfaces directly with the circuit board 14 enclosed by housing 12. In a typical application, the exterior surface of the housing 12 is provided with a series of raised fins 13 for improved heat dissipation, and the ambient pressure sensor 18 is preferably nestled among the fins 13 as shown to protect the ambient pressure sensor 18 from damage when the housing 12 contacts other objects.

Figure 2A:
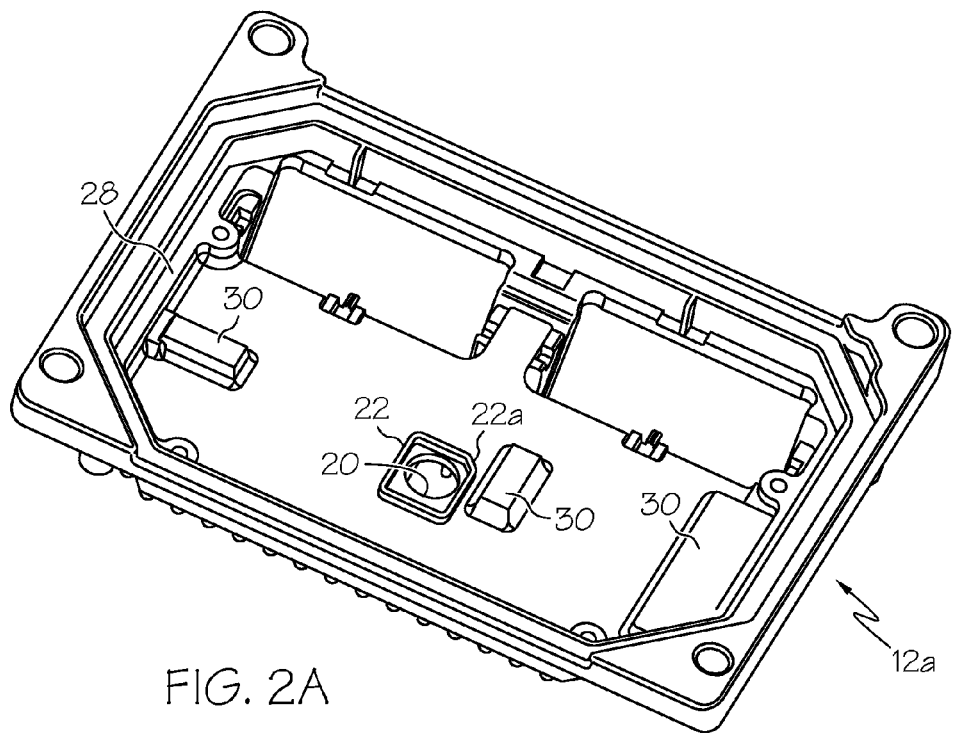
FIG. 2A is an isometric interior view of a housing-half of the ECM of FIG. 1, without the integral ambient air pressure sensor.
Figure 2B:
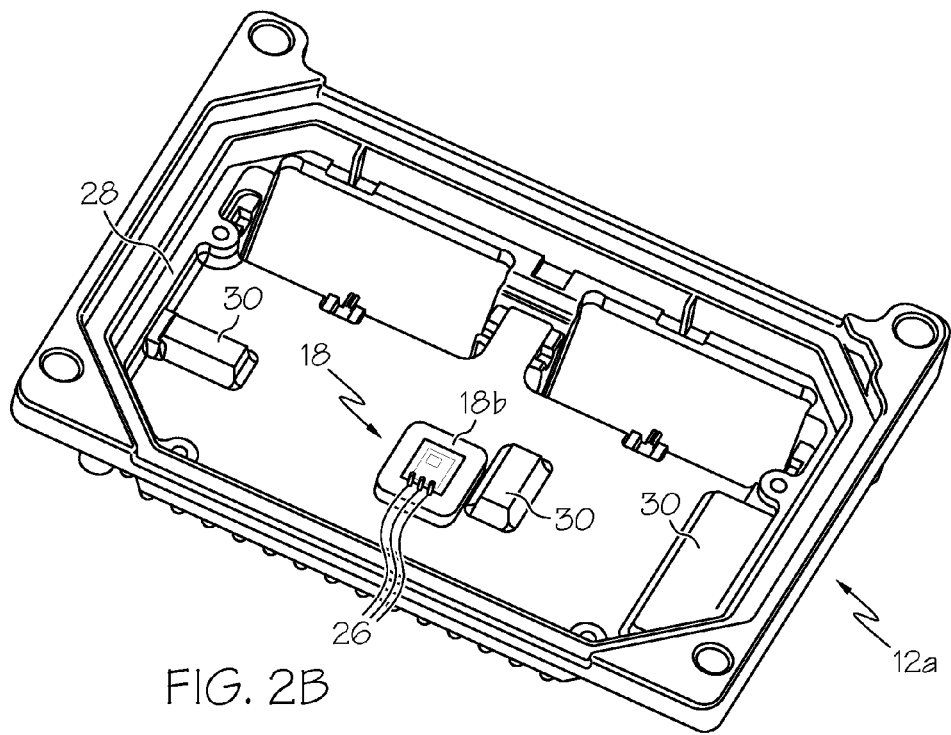
FIG. 2B is an isometric interior view of the housing-half of FIG. 1, but with the integral ambient air pressure sensor.

The housing 12 of ECM 10 typically comprises a pair of die-cast metal halves, and FIGS. 2A-2B illustrate the interior face of the housing half 12a seen in the view of FIG. 1, but with the connector 16 removed. Of pertinence to the present invention, a central portion of the housing half 12a (i.e., a portion overlapping the circuit board 14) is provided with an opening 20 surrounded by a raised interior shoulder 22; see FIG. 2A.

Figure 3A:
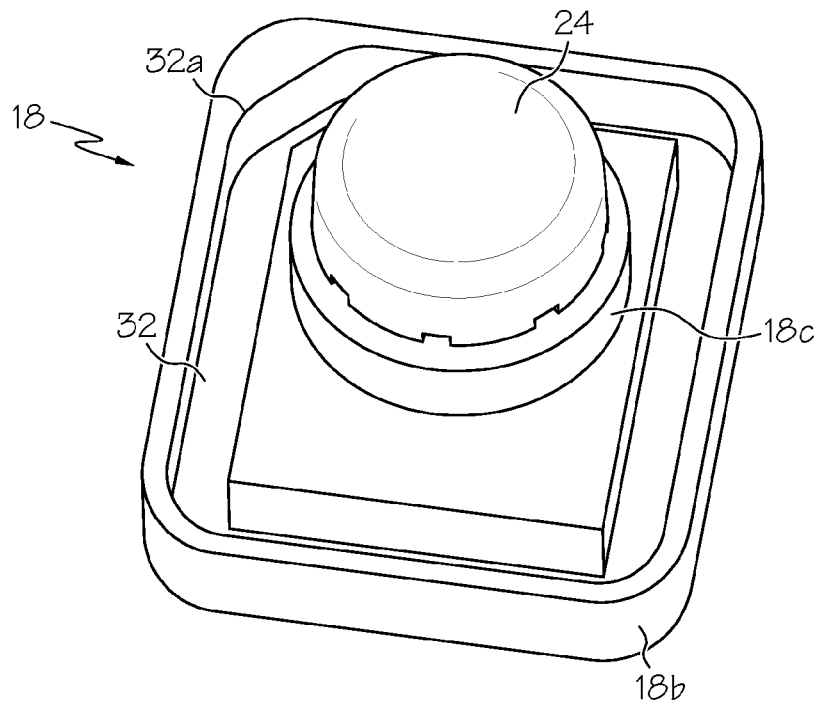
FIG. 3A is an isometric top view of the integral ambient air pressure sensor of FIGS. 1 and 2B.
Figure 3B:
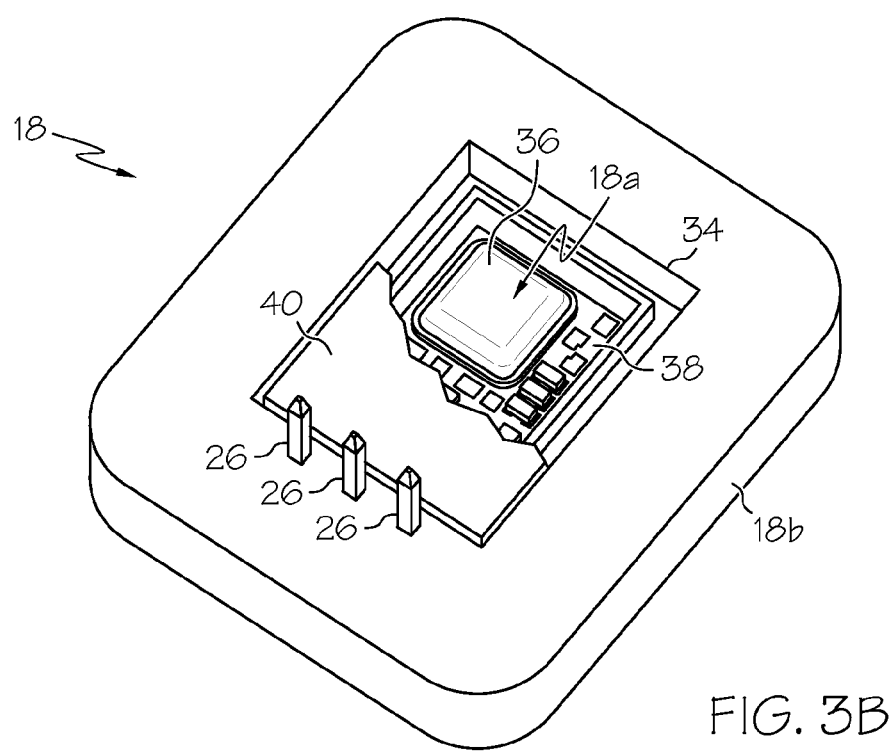
FIG. 3B is an isometric bottom view of the integral ambient air pressure sensor of FIGS. 1 and 2B.
Figure 4:
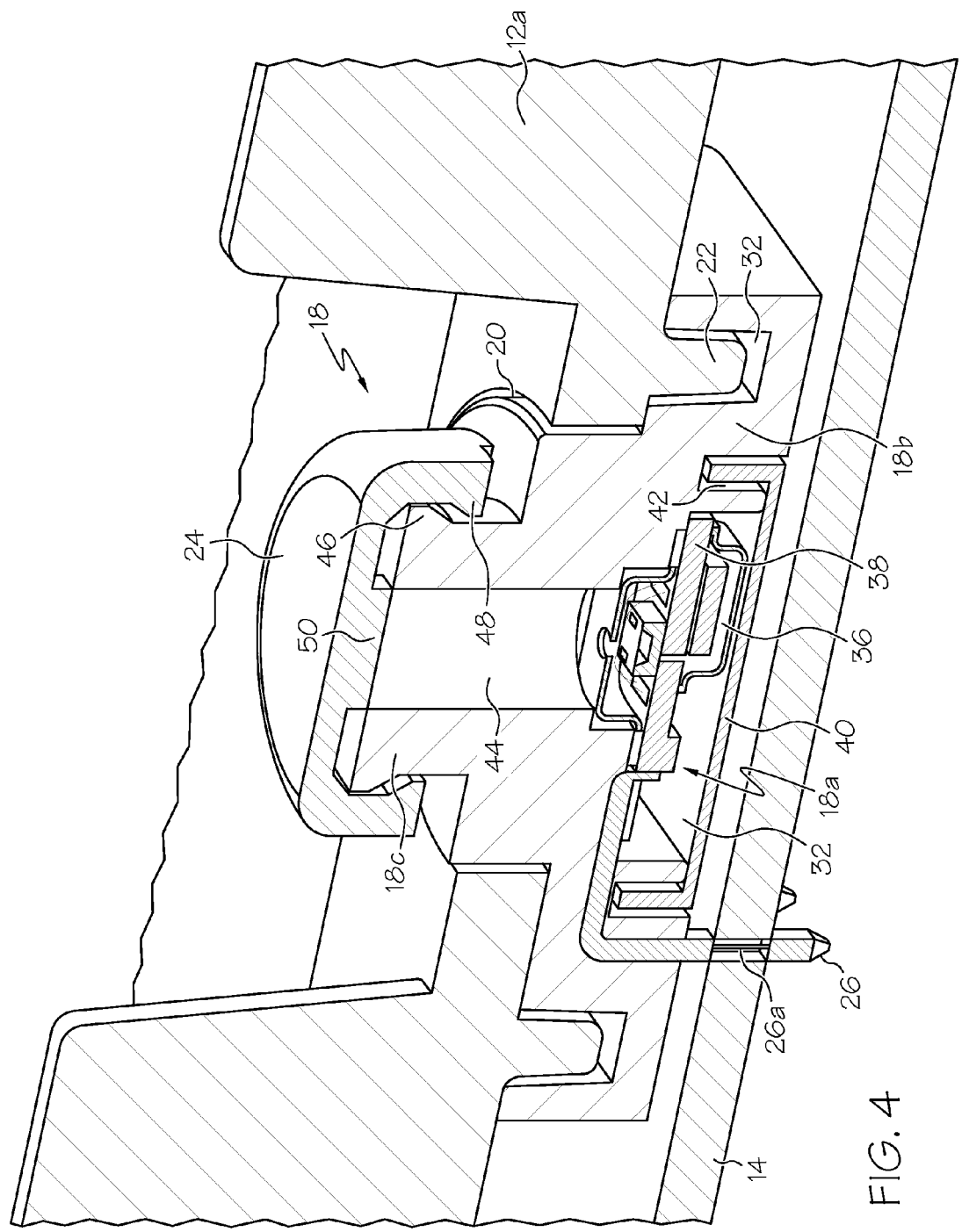
FIG. 4 is an isometric partial cross-sectional view of the ECM of FIG. 1.

As best seen in FIGS. 3A-3B and 4, the sensor 18 includes a sensor element 18a, a body portion 18b in which the sensor element 18a is mounted, and a riser portion 18c. The riser portion 18c extends out of the body portion 18b, and is capped by a splash-proof lid 24. Referring again to FIGS. 1 and 2A-2B, the riser portion 18c protrudes though the housing opening 20, and body portion 18b sealingly engages the raised shoulder 22 of housing half 12a to form an environmental seal around the opening 20. The body portion 18b is seen in the interior view of FIG. 2B, and the splash-proof lid 24 is seen in the exterior view of FIG. 1.

As shown in FIGS. 2B and 3B, the sensor 18 additionally includes a set of compliant terminals 26 for electrically coupling the sensor element 18a to the ECM's circuit board 14. As shown in FIG. 4, the terminals 26 are insert molded in the sensor body portion 18b, and preferably have compliant terminations 26a (eye-of-needle, for example) to enable solderless connection with the circuit board 14. The circuit board 14, in turn, is supported on a peripheral interior ledge 28 of housing half 12a, and a distributed set of pedestals 30 within the peripheral ledge 28. Significantly, the opening 20 and raised shoulder 22 are placed adjacent to a pedestal 30 to firmly support the circuit board 14 in the vicinity of the sensor 18 and maintain a prescribed distance between sensor 18 and circuit board 14 when circuit board 14 is mounted in housing half 12a.

Referring again to FIG. 3A, it will be seen that the body portion 18b and riser portion 18c of sensor 18 are molded as a unitary plastic part. The top face of body portion 18b includes a peripheral trough 32 surrounding the riser portion 18c that dimensionally corresponds to the raised shoulder 22 of housing half 12a. When the sensor 18 is mounted on the housing half 12a as shown in FIG. 2B, the raised shoulder 22 nests in the trough 32, as shown in the partial cross-sectional view of FIG. 4. Prior to such mounting of the sensor 18, however, a sealant/adhesive material is dispensed into the trough 32 to both secure the sensor 18 to the housing half 12a, and form an environmental seal around the housing opening 20. As also seen in FIGS. 2A and 3A, the raised shoulder 22 and the trough 32 are asymmetrically notched as respectively indicated by the reference numerals 22a and 32a to prevent the sensor 18 from being mounted in an incorrect orientation.

Referring particularly to FIGS. 3B and 4, the bottom (i.e., inboard-facing) face of the sensor body portion 18b includes a central recess 34 within the outline of trough 32 for accommodating the sensor element 18a. In the illustrated embodiment, the sensor element 18a is implemented as a three-terminal device, including a sensor chip 36 and various discrete and integrated signal processing devices mounted on a ceramic substrate 38. To prevent pressure within the sealed ECM 10 from influencing the sensed ambient air pressure, the inboard side of sensor element 18a is sealed with a cover 40 that nests in a peripheral trough 42 surrounding the central recess 34. And as with the trough 32, a sealant/adhesive material is dispensed into the trough 42 to both secure the cover 40 to the sensor body portion 18b, and form an environmental seal around the central recess 34.

FIG. 4 illustrates the ECM 10 with installed ambient pressure sensor 18. Accordingly, the body portion 18b of sensor 18 is sealingly secured to the raised interior shoulder 22 of housing half 12a, the riser portion 18c protrudes through the housing opening 20, and the compliant terminations 26a of sensor terminals 26 are received in plated openings provided in the ECM's circuit board 14. In the illustrated embodiment, the sensor element circuit board 38 is ceramic, and the insert molded terminals 26 are electrically coupled to bond sites formed on the face of the circuit board 38 by wirebonding. Alternately, the sensor circuitry can be mounted on a printed circuit board similar to the ECM circuit board 14, and in that case, the insert molded terminals 26 may be provided with compliant terminations for solderless interconnection with the sensor element circuit board.

As also shown in FIG. 4, the sensor 18 includes a central opening 44 extending though the body and riser portions 18b, 18c to couple the recess 32, and therefore the outboard face of the sensor element 18a, to atmospheric air outside the ECM 10. The top of the riser portion 18c is stepped radially-inward to accommodate the splash-proof lid 24 within the diameter of the housing opening 20, and the lid 24 is retained on riser portion 18c by a set of complementary interleaving tabs 46, 48 formed on the riser portion 18c and the lid 24, respectively. The lid 24 also has an integral axially-depending interior post 50 in alignment with the central opening 44 of sensor 18. The axial dimension of the post 50 is such that it blocks water intrusion into the central opening 44, while maintaining open communication between the central opening 44 and atmospheric air in and around the lid 24.

In summary, the ECM 10 of the present invention provides a cost-effective alternative to the conventional approach of using a discrete wired sensor to develop reliable ambient pressure input data for engine control algorithms implemented by the ECM control circuits. While the present invention has been described with respect to the illustrated embodiment, it is recognized that numerous modifications and variations in addition to those mentioned herein will occur to those skilled in the art. Accordingly, it is intended that the invention not be limited to the disclosed embodiment, but that it have the full scope permitted by the language of the following claims.

The invention claimed is:

1. An engine control module, comprising:
a housing;
a circuit board enclosed within said housing and supporting control module circuitry, wherein said circuit board defines plated openings;
an opening in the housing in alignment with said circuit board; and
an air pressure sensor mounted on an inboard face of said housing about said opening, said air pressure sensor including,
a body portion sealingly secured to the inboard face of said housing,
a sensing element mounted in a recess formed on an inboard face of said body portion,
a riser portion extending outboard of said body portion and protruding through said opening,
a central axial bore extending through said body and riser portions to couple said sensor element to atmospheric air pressure outside the housing, and
a set of inwardly-depending conductive terminals that engage said circuit board and electrically couple said sensing element to said control module circuitry, wherein said conductive terminals have compliant terminations received in said plated openings to provide a solderless electrical coupling between said conductive terminals and said circuit board.

2. The engine control module of claim 1, wherein said air pressure sensor includes a splash-proof lid capping an exposed end of said riser portion to prevent water intrusion into said central axial bore.

3. The engine control module of claim 2, wherein an outboard face of said housing includes a series of raised fins adjacent said opening, and said riser portion and splash-proof lid are nestled among said fins such that the fins shield the riser portion and splash-proof lid from damage when said housing contacts other objects.

4. The engine control module of claim 1, wherein said inboard face of said housing includes a pedestal adjacent said air pressure sensor to support said circuit board in the vicinity of said compliant terminations.

5. The engine control module of claim 1, wherein said sensing element is mounted on a sensor circuit board, said sensor circuit board is mounted in the recess of said body portion, and said conductive terminals are electrically coupled to said sensor circuit board.

6. The engine control module of claim 5, further comprising:
a cover sealingly secured to the inboard face of said body portion about said recess to isolate said sensor element from an interior volume of said housing.

7. The engine control module of claim 1, further comprising:
a trough formed on an outboard face of the body portion of said air pressure sensor surrounding said riser portion;
a raised shoulder formed on the inboard face of said housing surrounding said opening and nesting in said trough of said air pressure sensor; and
an adhesive sealant disposed in said trough to environmentally seal said sensor to said housing around said opening.

8. An engine control module, comprising:
a housing;
a circuit board enclosed within said housing and supporting control module circuitry;
an opening in the housing in alignment with said circuit board;

an air pressure sensor mounted on an inboard face of said housing about said opening, said air pressure sensor including,
    a body portion sealingly secured to the inboard face of said housing,
    a sensing element mounted in a recess formed on an inboard face of said body portion,
    a riser portion extending outboard of said body portion and protruding through said opening, a central axial bore extending through said body and riser portions to couple said sensor element to atmospheric air pressure outside the housing, and
    a set of inwardly-depending conductive terminals that engage said circuit board and electrically couple said sensing element to said control module circuitry;
a trough formed on an outboard face of the body portion of said air pressure sensor surrounding said riser portion;
a raised shoulder formed on the inboard face of said housing surrounding said opening and nesting in said trough of said air pressure sensor; and
an adhesive sealant disposed in said trough to environmentally seal said sensor to said housing around said opening.

9. The engine control module of claim 8, wherein said air pressure sensor includes a splash-proof lid capping an exposed end of said riser portion to prevent water intrusion into said central axial bore.

10. The engine control module of claim 9, wherein an outboard face of said housing includes a series of raised fins adjacent said opening, and said riser portion and splash-proof lid are nestled among said fins such that the fins shield the riser portion and splash-proof lid from damage when said housing contacts other objects.

11. The engine control module of claim 8, wherein the inwardly-depending conductive terminals of said air pressure sensor have compliant terminations to provide a solderless electrical coupling between said conductive terminals and said circuit board.

12. The engine control module of claim 11, wherein said inboard face of said housing includes a pedestal adjacent said air pressure sensor to support said circuit board in the vicinity of said compliant terminations.

13. The engine control module of claim 8, wherein said sensing element is mounted on a sensor circuit board, said sensor circuit board is mounted in the recess of said body portion, and said conductive terminals are electrically coupled to said sensor circuit board.

14. The engine control module of claim 13, further comprising:
    a cover sealingly secured to the inboard face of said body portion about said recess to isolate said sensor element from an interior volume of said housing.

* * * * *